United States Patent
Yun et al.

(10) Patent No.: US 11,333,447 B2
(45) Date of Patent: May 17, 2022

(54) ADDITIVELY MANUFACTURED HEAT EXCHANGERS AND METHODS FOR MAKING THE SAME

(71) Applicant: Hamilton Sundstrand Corporation, Charlotte, NC (US)

(72) Inventors: Thomas M. Yun, Glastonbury, CT (US); Vijay Narayan Jagdale, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 557 days.

(21) Appl. No.: 15/936,845

(22) Filed: Mar. 27, 2018

(65) Prior Publication Data

US 2019/0301816 A1    Oct. 3, 2019

(51) Int. Cl.
| | |
|---|---|
| F28F 3/02 | (2006.01) |
| B29C 64/40 | (2017.01) |
| B33Y 10/00 | (2015.01) |
| F28F 7/02 | (2006.01) |
| B33Y 80/00 | (2015.01) |
| B29L 31/18 | (2006.01) |
| F28D 9/00 | (2006.01) |

(52) U.S. Cl.
CPC .............. *F28F 3/025* (2013.01); *B29C 64/40* (2017.08); *B33Y 10/00* (2014.12); *F28F 7/02* (2013.01); *B29L 2031/18* (2013.01); *B33Y 80/00* (2014.12); *F28D 9/0062* (2013.01); *F28D 9/0081* (2013.01); *F28F 2255/18* (2013.01)

(58) Field of Classification Search
CPC ....... F28F 3/025; F28F 2255/18; B33Y 10/00; B33Y 80/00; B29C 64/40; B29L 2031/18; F28D 9/0062; F28D 9/0081

USPC .......................................................... 165/164
See application file for complete search history.

(56) References Cited

U.S. PATENT DOCUMENTS

| | | | | |
|---|---|---|---|---|
| 2,782,009 | A * | 2/1957 | Rippingille | F28D 9/0062 165/166 |
| 3,255,816 | A * | 6/1966 | Rosenblad | F28D 9/0062 165/166 |
| 4,183,403 | A * | 1/1980 | Nicholson | F28D 9/0068 165/166 |
| 4,771,826 | A * | 9/1988 | Grehier | F28F 3/083 165/166 |

(Continued)

FOREIGN PATENT DOCUMENTS

| | | |
|---|---|---|
| EP | 3269474 A1 | 1/2018 |
| EP | 3293478 A1 | 3/2018 |

OTHER PUBLICATIONS

Extended European search report issued in corresponding European patent application No. 19165561.2 dated Aug. 2, 2019.

*Primary Examiner* — Tho V Duong
*Assistant Examiner* — Raheena R Malik
(74) *Attorney, Agent, or Firm* — Locke Lord LLP; Daniel J. Fiorello; Gabrielle L. Gelozin

(57) ABSTRACT

An additively manufactured heat exchanger can include a plurality of vertically built fins, and a plurality of non-horizontally built parting sheets. The plurality of vertically built fins can extend between and connect to the plurality of parting sheets. The heat exchanger can include a plurality of layers of fins and parting sheets. The heat exchanger can include first and second flow circuits for allowing separate fluid flows to flow through the heat exchanger to exchange heat therebetween.

14 Claims, 5 Drawing Sheets

(56) References Cited

U.S. PATENT DOCUMENTS

| | | | |
|---|---|---|---|
| 7,866,377 B2 | 1/2011 | Slaughter | |
| 9,851,159 B2 * | 12/2017 | Cameron | F28D 9/0031 |
| 10,175,003 B2 * | 1/2019 | Sennoun | F28C 3/04 |
| 2007/0284095 A1 | 12/2007 | Wang et al. | |
| 2008/0095611 A1 * | 4/2008 | Storage | F01D 25/125 |
| | | | 415/116 |
| 2008/0149313 A1 * | 6/2008 | Slaughter | B22F 3/1055 |
| | | | 165/148 |
| 2010/0181053 A1 * | 7/2010 | Hecht | F28D 9/0068 |
| | | | 165/164 |
| 2013/0236299 A1 * | 9/2013 | Kington | F02C 7/10 |
| | | | 415/177 |
| 2014/0360698 A1 * | 12/2014 | Waldman | B22F 3/1055 |
| | | | 165/81 |
| 2016/0108815 A1 * | 4/2016 | Schmitz | F28D 1/0476 |
| | | | 165/51 |
| 2016/0109130 A1 * | 4/2016 | Stastny | F23R 3/04 |
| | | | 60/755 |
| 2016/0305720 A1 | 10/2016 | Rhee et al. | |
| 2017/0082372 A1 | 3/2017 | Vos et al. | |
| 2017/0205149 A1 | 7/2017 | Herring et al. | |
| 2017/0211896 A1 | 7/2017 | Schwalm et al. | |
| 2017/0219291 A1 | 8/2017 | Leemans et al. | |
| 2020/0333089 A1 * | 10/2020 | Sailler | F28D 9/0062 |

* cited by examiner

ADDITIVELY MANUFACTURED HEAT EXCHANGERS AND METHODS FOR MAKING THE SAME

BACKGROUND

1. Field

The present disclosure relates to additive manufacturing, more specifically to heat exchangers made by additive manufacturing.

2. Description of Related Art

In additive manufacturing (AM), part build orientation is an important build process consideration because of its impact on buildability and resultant part build quality. For better buildability, due to difficulties in AM (e.g. in powder bed process) to build overhung features, orienting part in build setup so that critical part features are at certain angle (e.g. 45 degree) is commonly practiced. On the other hands, in terms of AM build quality, such as but not limited to, surface roughness, resolution for small/thin features, and defect formation, different build orientations can be preferred. Specifically, for AM heat exchanger performance, reducing surface roughness and thickness is beneficial, and choosing AM build orientation to create fins vertically is favorable as it results in thinnest possible fins with preferentially oriented surface roughness. However, design of traditional plate fin heat exchangers consist of vertical fins and horizontal parting sheet layers, thus it is difficult to build in the direction of vertical fins as it renders parting sheets in most challenging, horizontal, overhung orientation. Even successful builds can result in rough downfacing surfaces and potentially defective parting sheets at such orientation, while any other rotated orientation prevents most desired vertically built fins.

Such conventional approaches in selecting build orientation for a powder bed additive manufacturing have generally been considered satisfactory for their intended purpose. However, there is an associated performance penalty and there is a need in the art for improved additively manufactured heat exchangers and methods for making the same. The present disclosure provides a solution for this need.

SUMMARY

In accordance with at least one aspect of this disclosure, an additively manufactured heat exchanger can include a plurality of vertically built fins, and a plurality of non-horizontally built parting sheets. The plurality of vertically built fins can extend between and connect to the plurality of parting sheets. The heat exchanger can include a plurality of layers of fins and parting sheets.

The heat exchanger can include first and second flow circuits for allowing separate fluid flows to flow through the heat exchanger to exchange heat therebetween. In certain embodiments, the first and second flow circuits can be perpendicular flow circuits. In certain embodiments, the first and second flow circuits can be counter flow circuits. In certain embodiments, the first and second flow circuits can be combination of cross and counter flow circuits.

In certain embodiments, one or more parting sheets can be flat shaped. In such embodiments, the plurality of fins can be angled at a non-right angle to the one or more parting sheets (e.g., which allows vertical building of the plurality of fins and non-horizontal building of the parting sheets).

In certain embodiments, one or more parting sheets can be non-flat shaped. For example, the parting sheets can be curved into the vertical build direction. A curvature of the curved parting sheets can be large enough to prevent build structure from being required to form the curved parting sheets during additive manufacturing. The fins can be flat (e.g., planar), thin walled fins, for example. In certain embodiments, fins can be straight fins, wavy fins or stripe fins with non-horizontally built plurality of parting sheets, or any other suitable shape.

In accordance with at least one aspect of this disclosure, a method for additively manufacturing a heat exchanger includes vertically building a plurality of fins, and non-horizontally building a plurality of parting sheets, wherein the plurality of vertically built fins extend between and connect to the plurality of parting sheets.

In certain embodiments, the method can include angling the parting sheets at a non-right angle relative to build direction during building. In such embodiments, the method can include building a support structure to support the heat exchanger while building the heat exchanger.

In certain embodiments, non-horizontally building the plurality of parting sheets can include building a plurality of flat (e.g., planar) parting sheets. Any other suitable shape is contemplated herein.

Non-horizontally building the plurality of parting sheets can include building a plurality of non-flat, e.g., curved parting sheets. Building the plurality of curved parting sheets can include building a first curved parting sheet, then vertically building the plurality of fins, wherein vertically building the plurality of fins includes vertically building the plurality of fins on a first curved parting sheet. Building the plurality of curved parting sheets can include building a second curved parting sheet on the plurality of fins.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
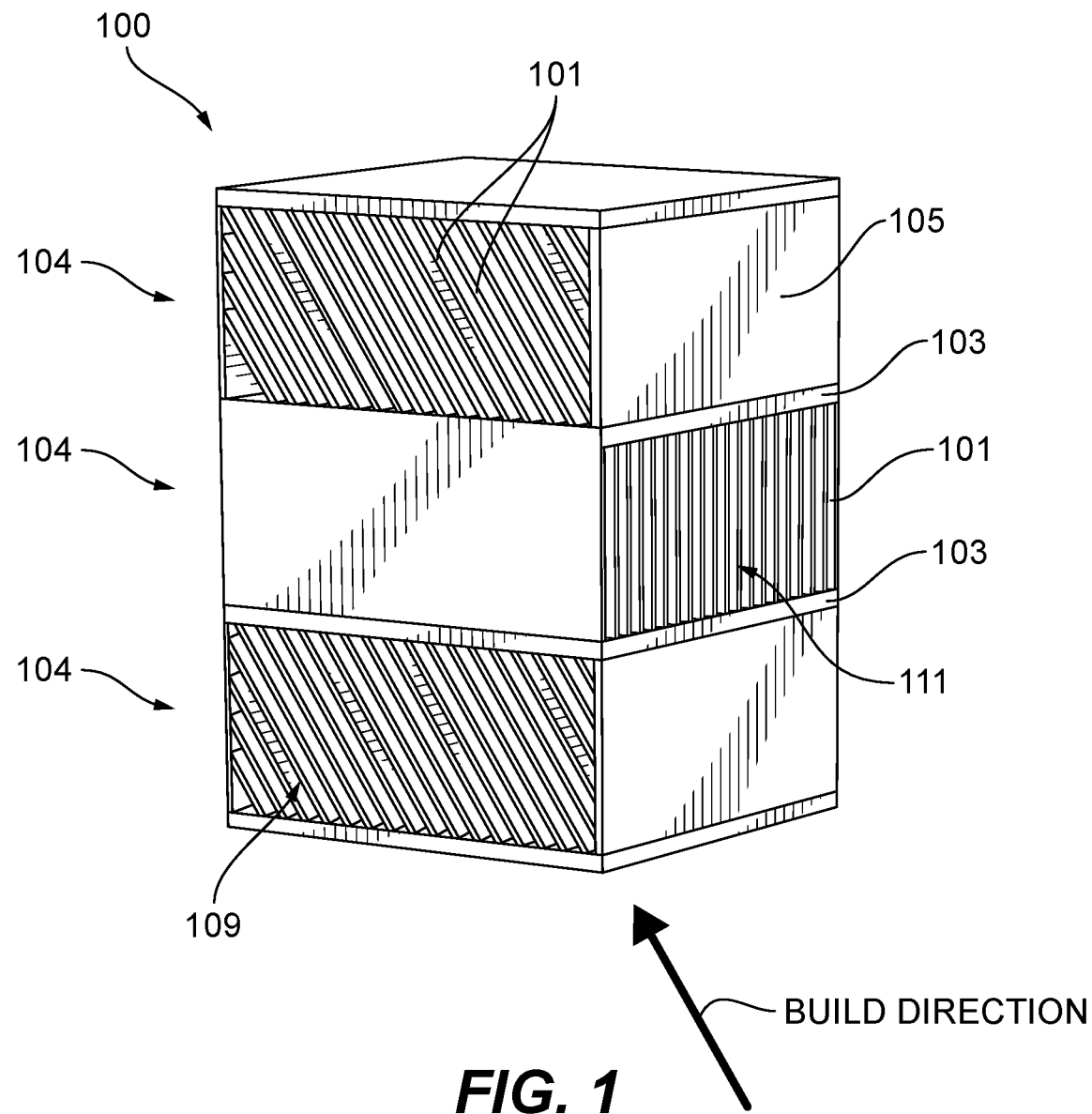
FIG. 1 is a perspective view of an embodiment of a heat exchanger in accordance with this disclosure, showing fins angled relative to parting sheets.

Reference will now be made to the drawings wherein like reference numerals identify similar structural features or aspects of the subject disclosure. For purposes of explanation and illustration, and not limitation, an illustrative view of an embodiment of a heat exchanger in accordance with the disclosure is shown in FIG. 1 and is designated generally by reference character 100. Other embodiments and/or aspects of this disclosure are shown in FIGS. 2-6. The systems and methods described herein can be used to reduce pressure drop in additively manufactured heat exchangers, as well as improve additive manufacturing of heat exchangers, for example.

Figure 2:
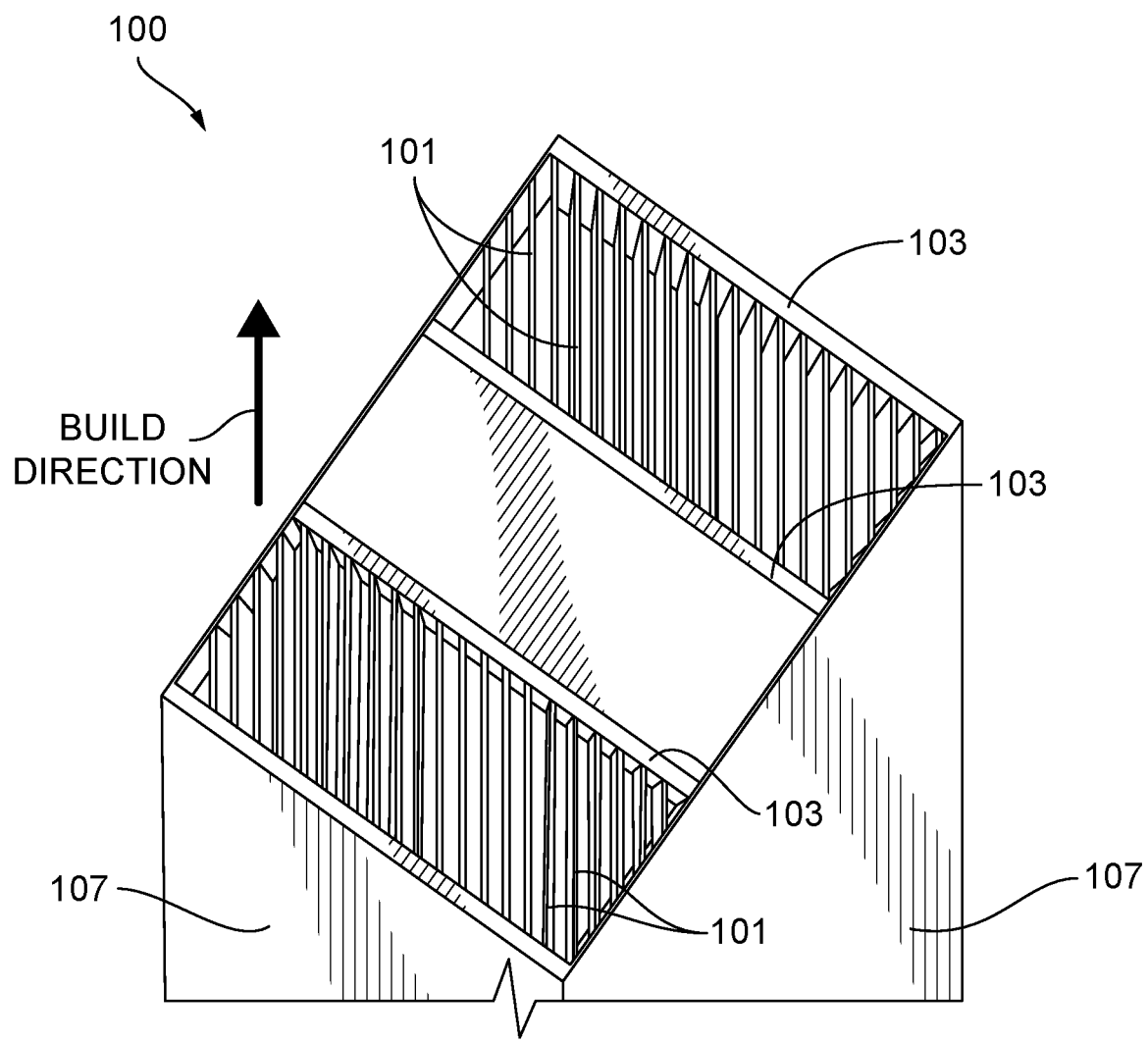
FIG. 2 is a perspective view of the embodiment of FIG. 1 during additive manufacturing, showing a build structure.
Figure 3:
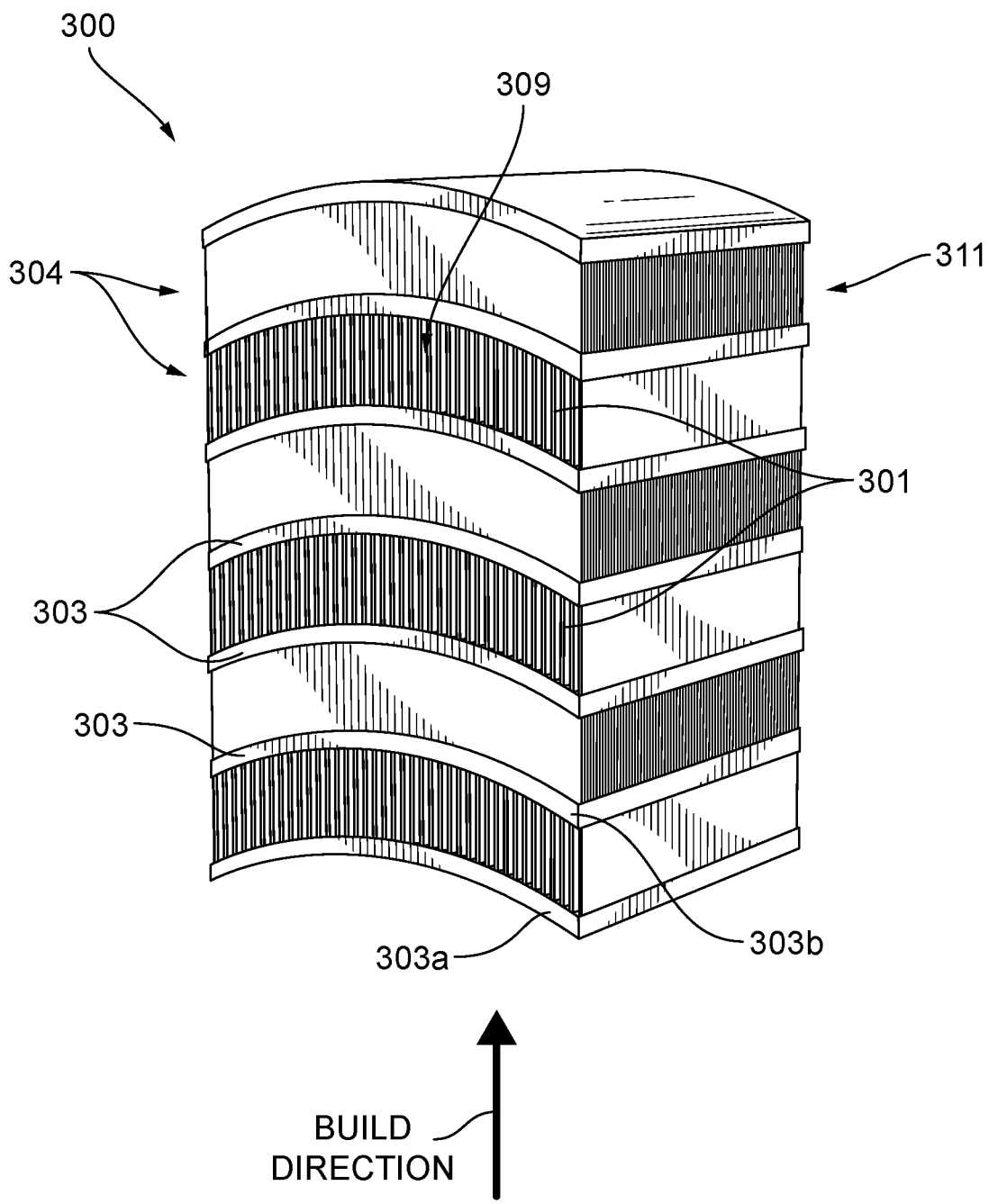
FIG. 3 is a perspective view of another embodiment of a heat exchanger in accordance with this disclosure, shown having non-flat parting sheets and built with a convex curve direction.

In accordance with at least one aspect of this disclosure, referring to FIGS. 1-3, an additively manufactured heat exchanger 100, 300 can include a plurality of vertically built fins 101, 301. Referring to FIGS. 1 and 2, the heat exchanger 100 can include a plurality of non-horizontally built parting sheets 103. For example, referring to FIG. 3, the heat exchanger 300 can include non-flat parting sheets 303.

Referring to FIGS. 1-3, the plurality of vertically built fins 101, 301 can extend between and connect to the plurality of parting sheets 103, 303 (e.g., by being formed integrally therewith during additive manufacturing). As shown, the heat exchanger 100, 300 can include a plurality of layers 104, 304 of fins 101, 301 and parting sheets 103, 303.

In certain embodiments, as shown in FIG. 1, one or more parting sheets 103 can be flat shaped (e.g., planar) and can be non-horizontally built. In such embodiments, the plurality of fins 101 can be angled at a non-right angle to the one or more parting sheets 103 (e.g., which allows vertical building of the plurality of fins 101 and non-horizontal building of the flat parting sheets 103). Therefore, the heat exchanger 100 can be built such that the parting sheets 103 have some vertical component when the fins 101 are built vertically. Embodiments can include one or more side walls 105 that enclose the angled fins 101 between the parting sheets 103.

Figure 4:
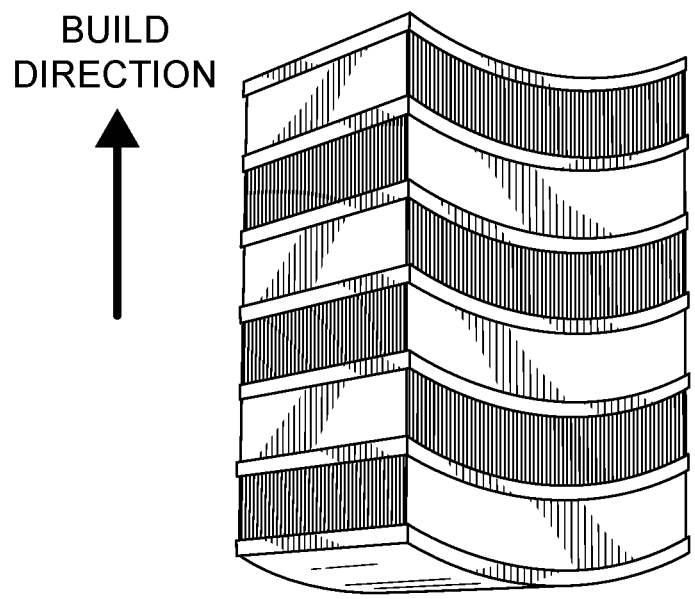
FIG. 4 is a perspective view of another embodiment of a heat exchanger in accordance with this disclosure, shown having non-flat parting sheets and built with a concave curve direction.

In certain embodiments, referring to FIG. 3, the one or more non-horizontally built parting sheets 303 can be non-flat shaped. For example, the parting sheets 303 can be curved, e.g., into the vertical build direction. Therefore, the heat exchanger 300 can be built such that the parting sheets 303 have some vertical component during build due to the non-flat shape when the fins 301 are built vertically. In certain embodiments, a curvature of the curved parting sheets 303 can be large enough to prevent build structure from being required to form the curved parting sheets 303 during additive manufacturing. In certain embodiments, the curved direction can be concave (e.g., as shown in FIG. 4) or convex to the build direction (e.g., as shown in FIG. 3).

As shown in FIGS. 1 and 3, the heat exchanger 100, 300 can include a first flow circuit 109, 309 and a second flow circuit 111, 311 for allowing separate fluid flows to flow through the heat exchanger 100, 300 to exchange heat therebetween. In certain embodiments, the first and second flow circuits can be perpendicular flow circuits as shown. In such embodiments, all fins 101, 301 can be built vertically, yet the fin 101, 301 positioning relative to the parting sheets 103, 303, or the fin geometry can be different between the perpendicular flow circuits.

Figure 5:
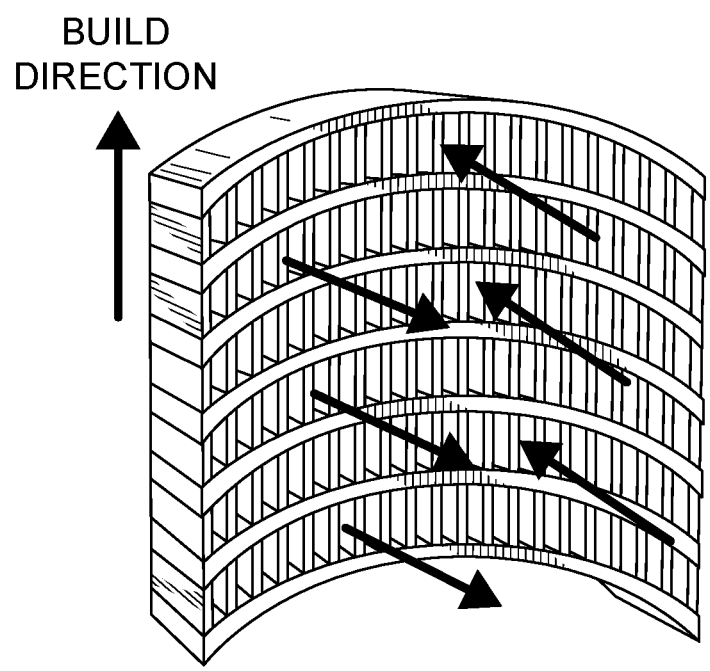
FIG. 5 is a perspective view of another embodiment of a heat exchanger in accordance with this disclosure, shown having counter flow circuits.

In certain embodiments, the first and second flow circuits 111, 311 can be counter flow circuits as shown in FIG. 5. In certain embodiments, the first and second flow circuits can be combination of cross/perpendicular and counter flow circuits.

Figure 6:
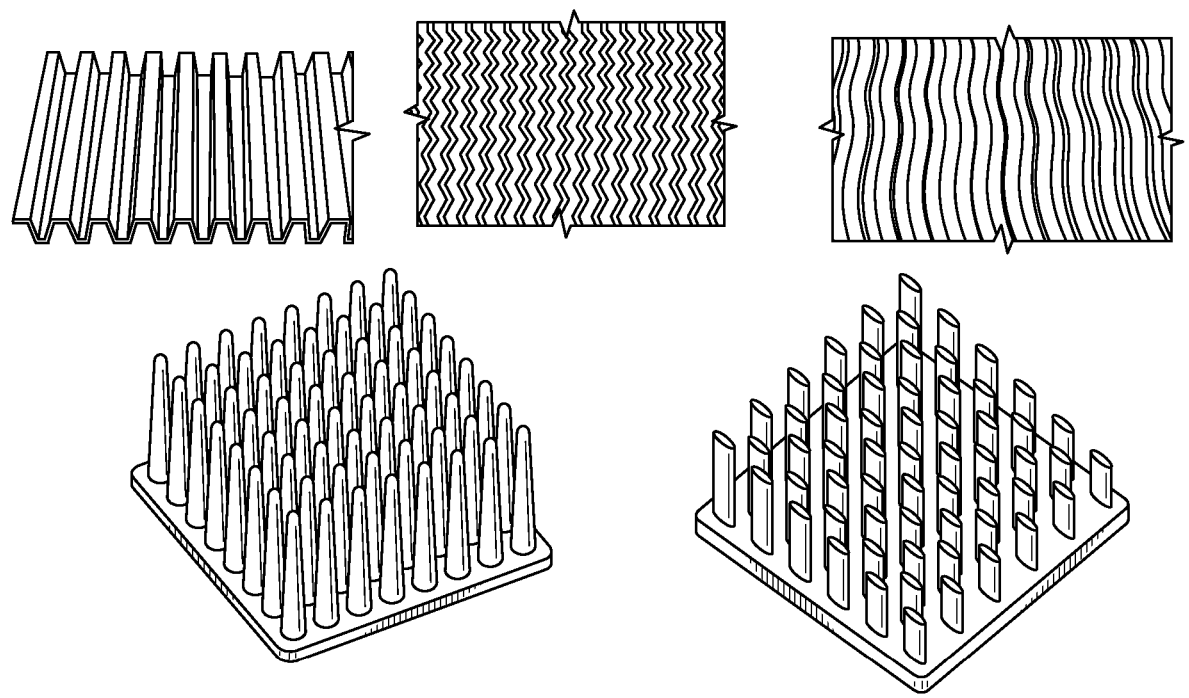
FIG. 6 shows various embodiments of fin designs in accordance with this disclosure.

In at least some embodiments herein, the fins 101, 301 can be flat (e.g., planar), thin walled fins, for example. In certain embodiments, fins can be straight fins, plain fins, wavy fins, strip fins, pin fins (circular and/or non-circular shape wavy fins), and/or any other suitable shape fins, e.g., as shown in FIG. 6. As appreciated by those having ordinary skill in the art in view of this disclosure, the term "vertically built" means that a the long axis of the fins 101, 301 and/or a planar vector of the fins 101, 301 is parallel with the vertical build direction.

For example, as shown in FIG. 1, the vertically built fins 101 of the first flow circuit 109 are angled at a non-right angle relative to the parting sheets 103, but the vertically built fins 101 of the second flow circuit 111 can be perpendicular relative to the parting sheets 103. As another example, as shown in FIG. 3, the vertically built fins 301 of the first flow circuit 309 are a straight rectangular shape between the parting sheets 303, but the vertically built fins 301 of the second flow circuit 311 have a curved shape to follow the curvature of the curved parting sheets 303.

In accordance with at least one aspect of this disclosure, a method for additively manufacturing a heat exchanger 100, 300 includes vertically building a plurality of fins 101, 301, and non-horizontally building a plurality of parting sheets 103, 303, wherein the plurality of vertically built fins 101, 301 extend between and connect to the plurality of parting sheets 103, 303.

In certain embodiments, the method can include angling the parting sheets 103 at a non-right angle relative to build direction during building. In such embodiments, as shown in FIG. 2, the method can include building a support structure 107 to support the heat exchanger while building the heat exchanger.

In certain embodiments, non-horizontally building the plurality of parting sheets can include building a plurality of flat (e.g., planar) parting sheets. Any other suitable shape is contemplated herein.

Non-horizontally building parting sheets can include building non-flat parting sheets 303, e.g., curved parting sheets 303. Building the plurality of curved parting sheets 303 can include building a first curved parting sheet 303a, then vertically building the plurality of fins 301 on the first curved parting sheet 303a. Building the plurality of curved parting sheets 303 can include building a second curved parting sheet 303b on the plurality of fins.

Embodiments utilize angled building at a predetermined angle to vertically build the fins, which at least some can be angled relative to the parting sheets (e.g., as shown in FIG. 1), but which also allows building horizontal plates without build structure within the flow circuits.

Embodiments with non-flat parting sheets may experience a small total change of mass-flow/face area, e.g., if the surface is curved, but performance is improved by improved surface finish/size of the vertically built fins. Embodiments allow fins to be thinner and have better surface finish Embodiments include all channel walls including fins built vertically, but parting sheet layers are built either at an angle or with a non-flat shape (e.g., curved) to minimize or eliminate overhung features during additive manufacturing. Embodiments have non-perpendicular fins to the parting sheets. The vertically built walls enable the lowest surface finish and the thinnest wall thickness compared fins built with other build orientations. Angled or non-flat parting sheet layers allow better buildability as well as reduced surface roughness and reduced defects formation. Minimum surface finish on channels achieved by vertical build orientation results in enhanced heat exchanger performance by avoiding an increase in pressure drop in flow through channels.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An additively manufactured heat exchanger, comprising:
   a plurality of vertically built heat transfer fins; and
   a plurality of non-horizontally built parting sheets, wherein the plurality of vertically built fins extend parallel to a build direction between and integral with the plurality of parting sheets, wherein the parting sheets are non-flat shaped, wherein the parting sheets are curved into the vertical build direction.

2. The heat exchanger of claim 1, further comprising a plurality of layers of fins and parting sheets.

3. The heat exchanger of claim 2, further comprising first and second flow circuits for allowing separate fluid flows to flow through the heat exchanger to exchange heat therebetween.

4. The heat exchanger of claim 3, wherein the first and second flow circuits are perpendicular flow circuits.

5. The heat exchanger of claim 1, wherein the plurality of fins are angled at a non-right angle to the parting sheets.

6. The heat exchanger of claim 1, wherein a curvature of the curved parting sheets is large enough to prevent build structure from being required to form the curved parting sheets during additive manufacturing.

7. The heat exchanger of claim 1, wherein a curvature of the curved parting sheet is convex or concave or any combination for convex and concave.

8. The heat exchanger of claim 3, wherein the first and second flow circuits include counter flow circuits and or combination of cross and counter flow circuits.

9. A method for additively manufacturing a heat exchanger, comprising:
   vertically building a plurality of heat transfer fins; and
   non-horizontally building a plurality of parting sheets, wherein the plurality of vertically built fins extend parallel to a build direction between and integral with the plurality of parting sheets, wherein building the plurality of parting sheets includes building a plurality of curved parting sheets, wherein the parting sheets are curved into the vertical build direction.

10. The method of claim 9, further comprising angling the parting sheets at a non- right angle relative to build direction during building.

11. The method of claim 10, further comprising building a support structure to support the heat exchanger while building the heat exchanger.

12. The method of claim 9, wherein the fins include at least one of straight fins, wavy fins, or stripe fins.

13. The method of claim 9, wherein building the plurality of curved parting sheets includes building a first curved parting sheet, then vertically building the plurality of fins, wherein vertically building the plurality of fins includes vertically building the plurality of fins on a first curved parting sheet.

14. The method of claim 13, wherein building the plurality of curved parting sheets includes building a second curved parting sheet on the plurality of fins.

* * * * *